Figure 4:
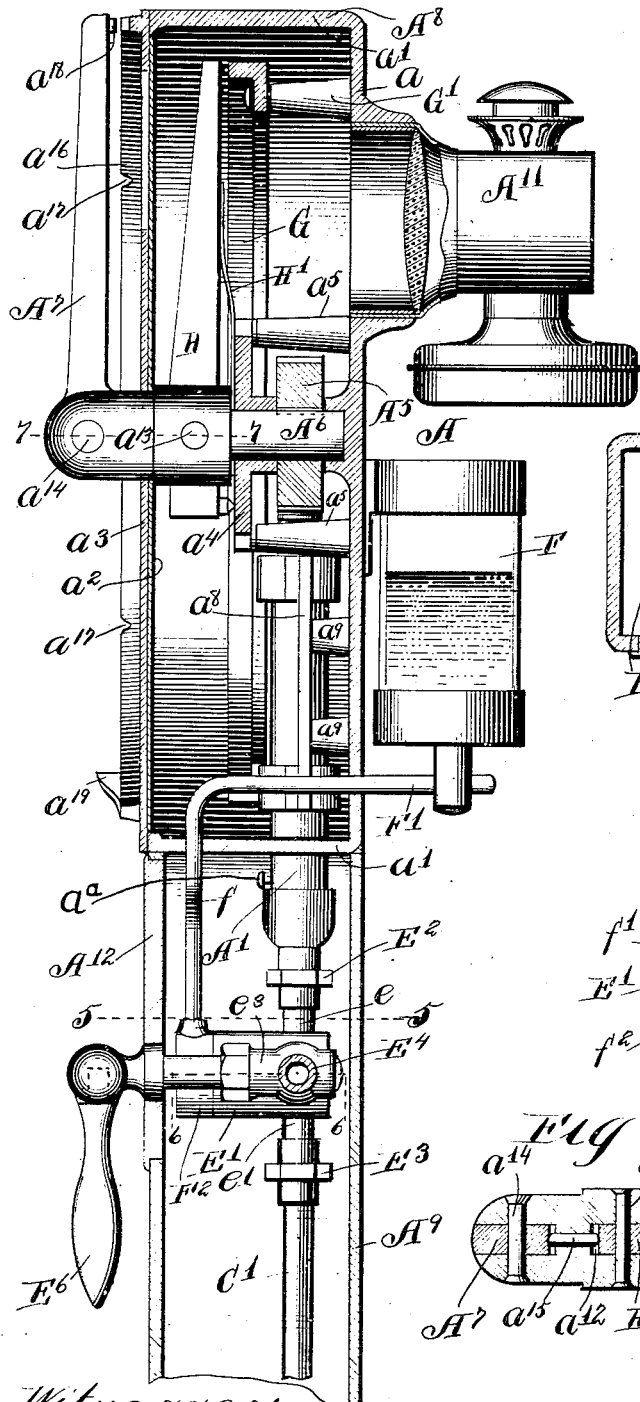

No. 677,541. Patented July 2, 1901.
R. H. GRUSCHOW & H. H. OSBORN.
SIGNALING DEVICE.
(Application filed Feb. 26, 1900.)
(No Model.) 6 Sheets—Sheet 1.
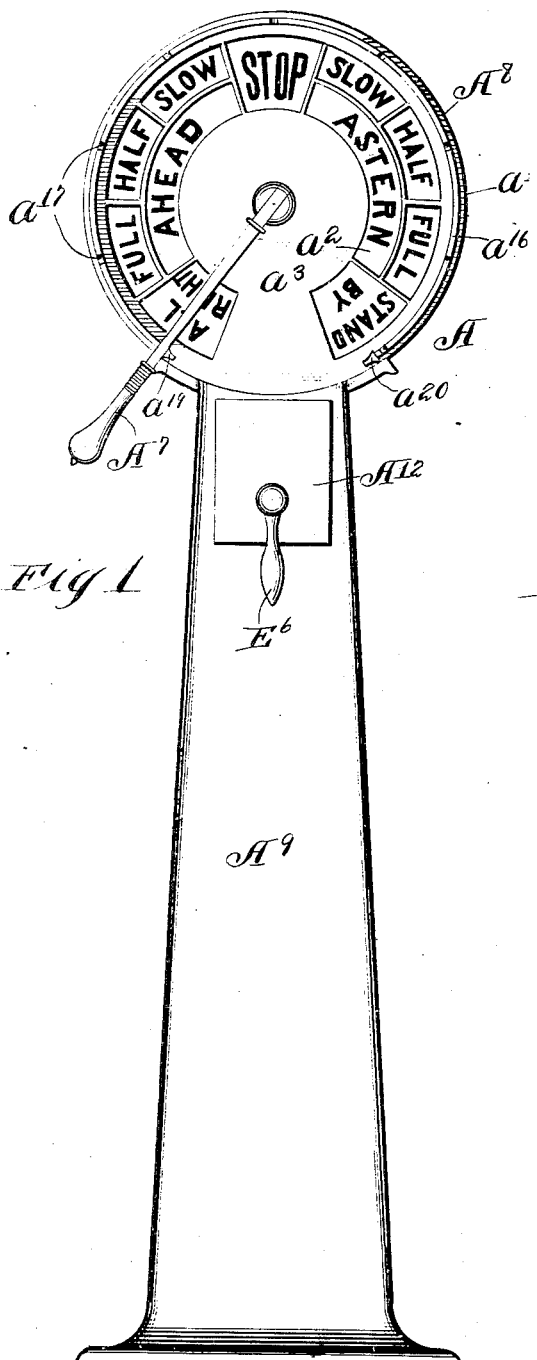
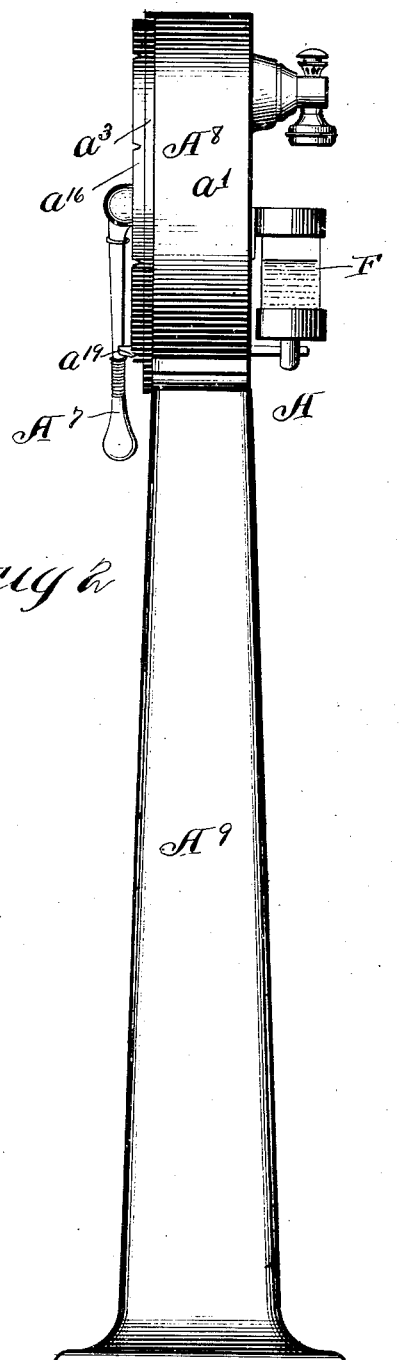
Witnesses:—
C. H. Crawford
William H. Hall
Inventors:—
Robert H. Gruschow
Howard H. Osborn
by Poole & Brown his Attorneys

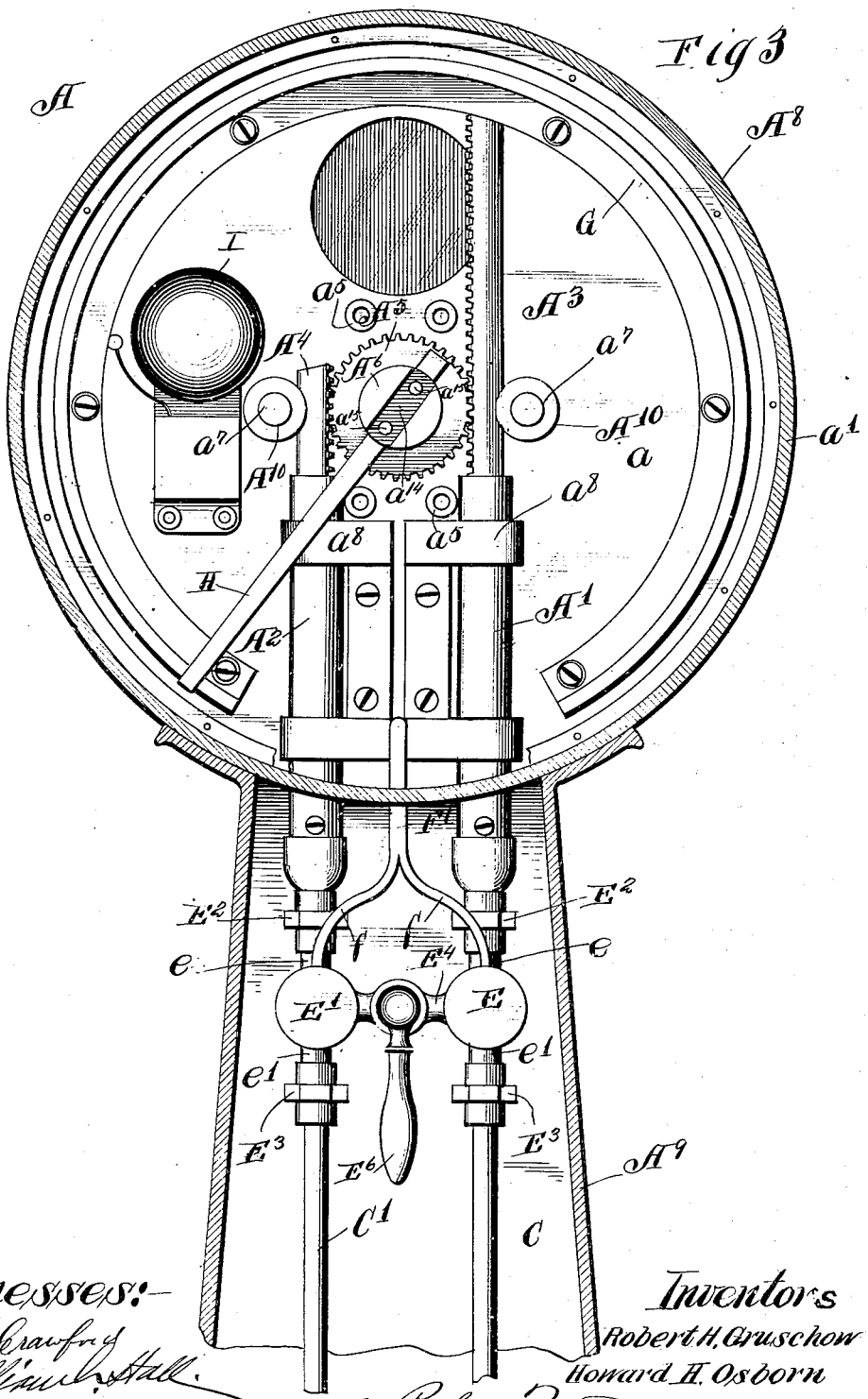

No. 677,541. Patented July 2, 1901.
R. H. GRUSCHOW & H. H. OSBORN.
SIGNALING DEVICE.
(Application filed Feb. 26, 1900.)
(No Model.) 6 Sheets—Sheet 3.

Witnesses:
C. H. Crawford
William L. Hall

Inventors:
Robert H. Gruschow
Howard H. Osborn
by Poole & Brown
his Attorneys

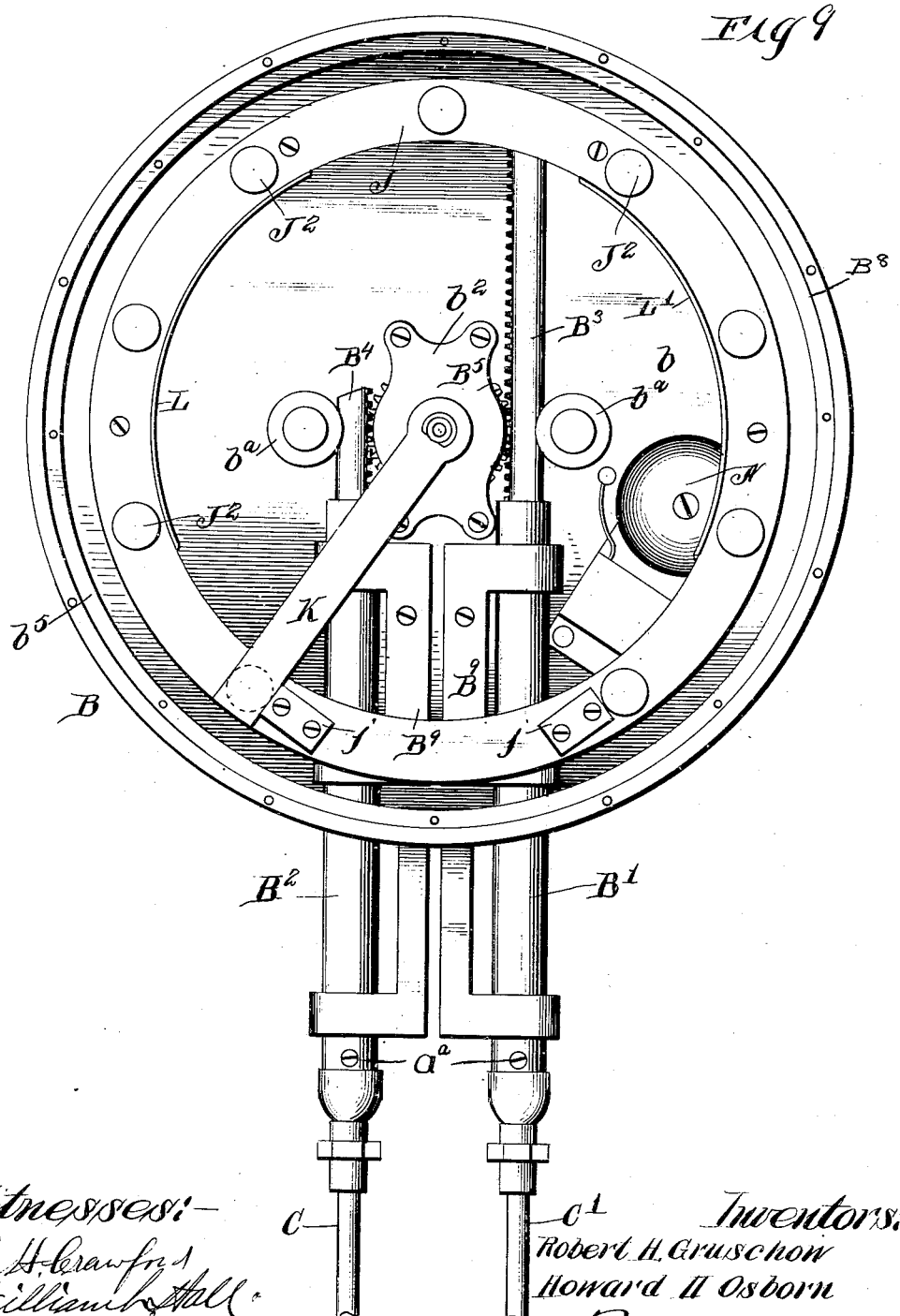

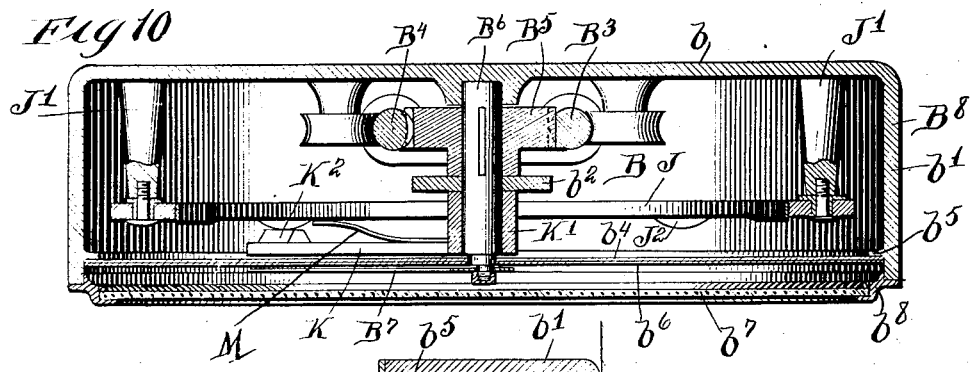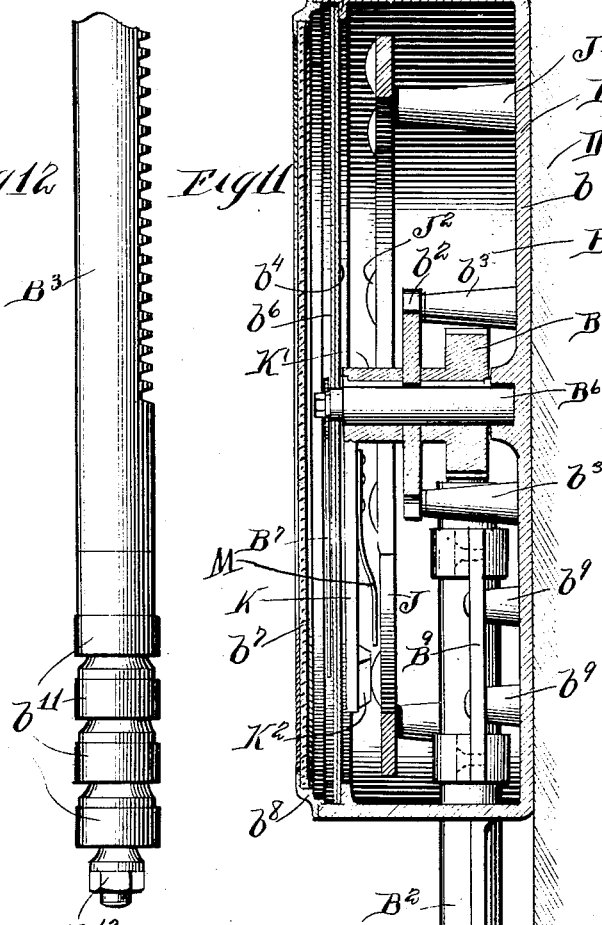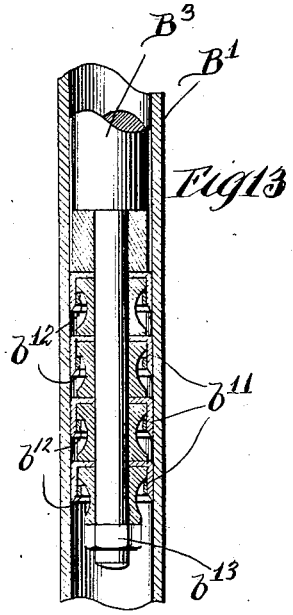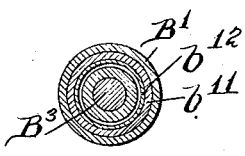

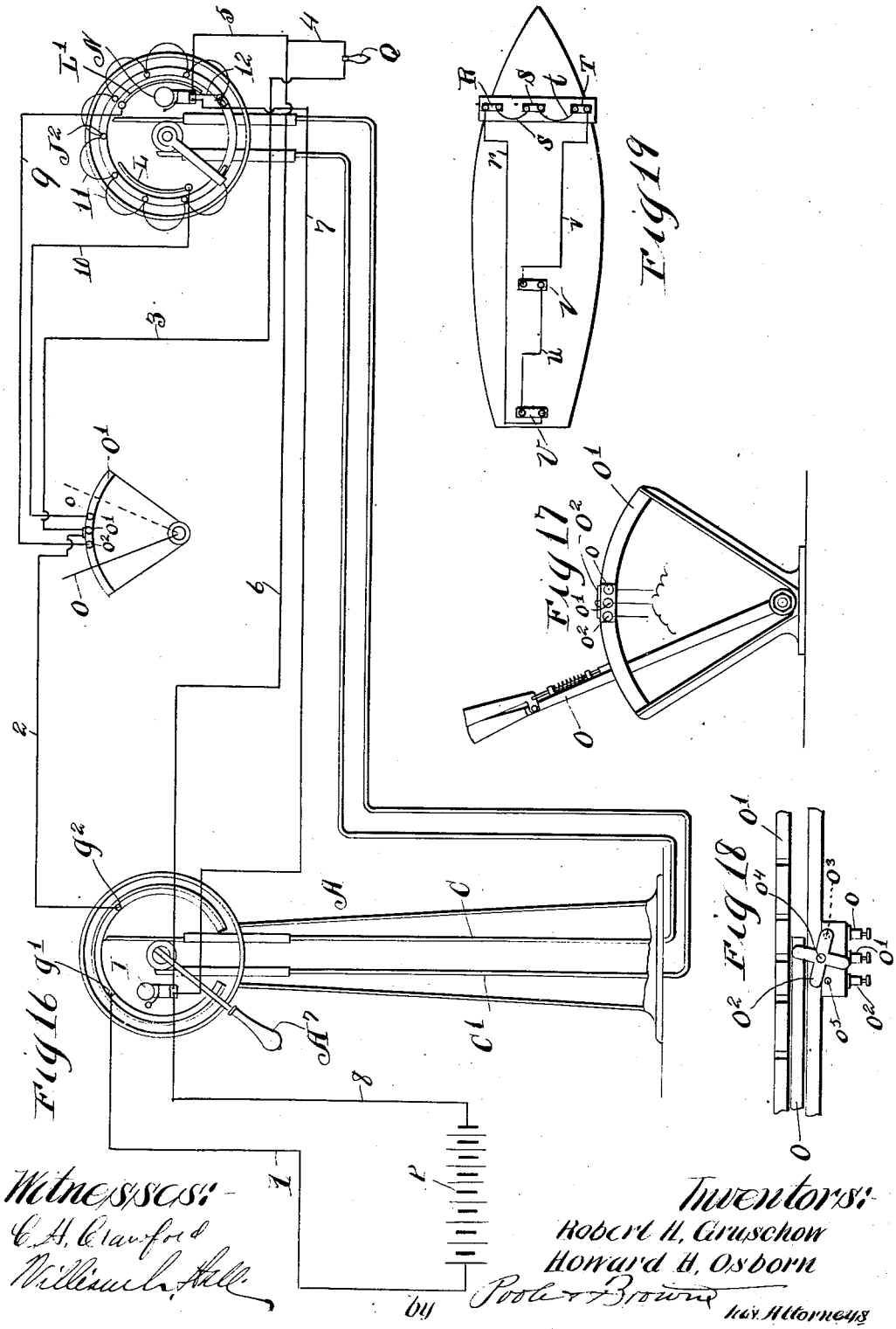

UNITED STATES PATENT OFFICE.

ROBERT H. GRUSCHOW AND HOWARD H. OSBORN, OF CHICAGO, ILLINOIS, ASSIGNORS OF ONE-THIRD TO DONALD MacLEAN, OF SAME PLACE.

SIGNALING DEVICE.

SPECIFICATION forming part of Letters Patent No. 677,541, dated July 2, 1901.

Application filed February 26, 1900. Serial No. 6,502. (No model.)

*To all whom it may concern:*

Be it known that we, ROBERT H. GRUSCHOW and HOWARD H. OSBORN, of Chicago, in the county of Cook and State of Illinois, have invented certain new and useful Improvements in Signaling Devices; and we do hereby declare that the following is a full, clear, and exact description thereof, reference being had to the accompanying drawings, and to the characters of reference marked thereon, which form a part of this specification.

This invention relates to improvements in signaling apparatus for transmitting orders from one place to another—as, for instance, from the bridge or pilot-house of a vessel to the engine-room below.

A signaling apparatus embodying our invention embraces generally a transmitting device having a dial and a pointer and a receiving device having a similar dial and pointer and connections between said pointers, whereby movement of one of the pointers on its dial gives a corresponding and equal movement to the pointer of the other device, so that when an order is recorded on the transmitting device a corresponding order will be indicated on the receiving device.

The invention further contemplates the use of electrical signaling and alarm devices to be operated in conjunction with the transmitting and receiving devices, whereby a signal may be transmitted from one of said devices to the other either at the time an order is transmitted and received or at other times, and contemplates also an arrangement of such electric signaling and alarm device whereby an automatic alarm will be given at the time an order is transmitted. Said automatic alarm device will preferably be so arranged and constructed that an alarm will be sounded at both the transmitting and receiving devices and continued until the order given at such time is executed, so that the person at the receiving device will know that a new order has been transmitted, and the cessation of such alarm will indicate to the person at the transmitting device that the order has been executed.

The invention also contemplates the connection of two or more transmitting devices located at different and separate places with a single receiving device and so connected that an order may be transmitted from either of the same to the receiving device.

Other features of our invention will hereinafter more fully appear.

The objects of the invention are, first, to provide an improved construction in apparatus of this character which is accurate and efficient under all usual conditions; second, one which will enable the person at either the transmitting or receiving device to be at all times in direct communication with the person at the other device; third, to enable the person at the transmitting device to determine at all times if the orders transmitted by him are being properly received and executed, and, fourth, to produce an alarm when a new order is recorded which will continue until the order has been executed or recalled.

We have shown in the drawings one embodiment of our invention, which is described as used in connection with the bridge and engine-room of a steam-driven vessel; but it will be understood that the essential features of the invention may be used in other connections where it is desirable to transmit orders or signals from one place to another.

The invention consists in the matter hereinafter set forth, and more particularly pointed out in the appended claims.

Figure 5:
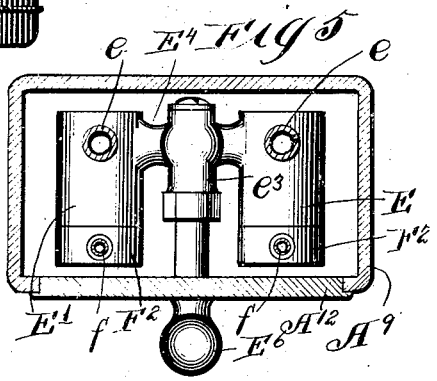
Figure 6:
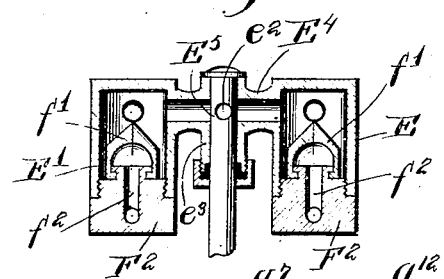
Figures 7, 8:
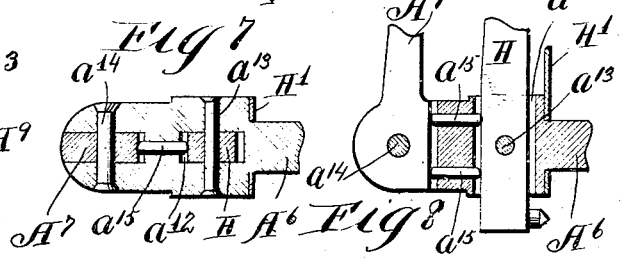

In the drawings, Figure 1 is a front elevation of the transmitting device. Fig. 2 is a side elevation thereof. Fig. 3 is a vertical section of the transmitting device in a plane parallel with the dial thereof. Fig. 4 is a vertical section of said device in a plane at right angles to the plane of Fig. 3. Fig. 5 is a horizontal section taken on line 5 5 of Fig. 4. Fig. 6 is a horizontal section taken on line 6 6 of Fig. 4. Fig. 7 is a detail section taken on line 7 7 of Fig. 4. Fig. 8 is a detail view, partly in section and partly in elevation, of the parts shown in Fig. 7 in another plane. Fig. 9 is a front elevation of the receiving device with the dial-frame and dial removed therefrom to show the operative parts of the device. Fig. 10 is a central horizontal section of the receiving device. Fig. 11 is a central vertical section of said device. Fig. 12 is a side elevation of one of the plungers embodied in the transmitting and receiving devices. Fig. 13 is a fragmentary longitudinal section of the piston and cylinders. Fig. 14 is a cross-section of said plunger. Fig. 15 is a detail view of an expansion-ring used in the plunger. Fig. 16 is a diagrammatic view showing the mechanical connections between the transmitting and receiving devices and also electrical connections between the same, whereby audible signals or alarms may be transmitted from one device to the other. Fig. 17 is a side elevation of the engine-reversing lever and its quadrant, showing terminals of the electric circuits located thereon. Fig. 18 is a plan view of the quadrant and lever, showing a switching-lever for alternately connecting said contact points or terminals. Fig. 19 is a diagrammatic view in plan of a vessel, showing the manner of connecting a number of transmitting devices with one receiving device.

As shown in the drawings, A, Figs. 1 and 2, designates the transmitting device, which may be located either on the bridge, at the pilot-house, or at any other suitable point on the deck, and B, Figs. 9 and 11, designates the receiving device, which is located in the engine-room in position to be in view of the engineer when he is in his usual position. Each of said devices is provided with a dial, (shown in Fig. 1 as made circular;) but said dial, so far as certain features of the invention are concerned, may be made of other form. On said dial are printed or otherwise indicated the usual orders which it is necessary to transmit from the bridge or pilot-house to the engineer. The orders on one side of the dial pertain to the forward or "ahead" motion of the engine, and on the other side are indicated like orders with respect to the backward or "astern" movement of the engine. As herein shown, each side of said dial with respect to either of the conditions of movement of the engine is provided with three orders—namely, "full," "half," and "slow." Between each series of orders is printed the word "stop," which is used to indicate that the engine is to be brought to a full stop. At the opposite ends of the said series of orders are printed the orders "all right" and "stand by," indicating, respectively, to the engineer to maintain the direction of the engine in one instance and in the other instance for the engineer to make himself ready for further orders. The dial of each transmitting and receiving device is provided with a pointer, the outer end of which is adapted to move in a path over either of the printed orders on the dial to indicate an order to be transmitted or received. The mechanism which actuates said pointers of the transmitting and receiving devices is connected in such manner that the pointers will move synchronously one with the other and to a like extent, so that the pointer on the receiving device will indicate at any given time the order which is recorded by the pointer on the transmitting device.

In connection with the construction for visually indicating the orders transmitted from the deck or bridge to the engine-room it is desirable to provide means for enabling the person using the transmitting device to give an audible signal to the engine-room and also to enable the engineer to transmit a reply-signal from the engine-room to the transmitting device. Moreover, it is desirable not only that the person at the transmitting device shall be able at all times to transmit an audible signal to the engine-room, but that an automatic alarm be transmitted to the engine-room when a new order is given to inform the person at the receiving device thereof. Means are herein shown for producing such automatic alarm connected with the reversing mechanism of the engine, which are so arranged that an alarm will be continued after an order has once been given to reverse the motion of the engine until the order has been complied with. Such automatic alarm device may, however, be connected with other parts of the engine. We have, furthermore, provided means for giving an automatic audible alarm in case the indicating-pointers on the transmitting and receiving devices get out of their proper relations, so that the person operating the transmitting device may by this means determine when the orders which he is transmitting are not being correctly received on the receiving device and may correct the inaccuracies in the devices.

First referring to the mechanical connections between the transmitting and receiving devices, whereby the pointers are given synchronous and equal movements, an approved form of these parts is made as follows: $A'$ $A^2$ designate cylinders in the transmitting device, within which are contained plungers $A^3$ $A^4$. $B'$ $B^2$ designate like cylinders in the receiving device, within which are contained plungers $B^3$ $B^4$. The cylinders are connected at their lower ends by means of pipes C C', the pipe C connecting the cylinders $A'$ $B^2$ and the pipe C' connecting the cylinders $A^2$ $B'$. The cylinders below the piston and the pipes connected therewith are completely filled with a liquid constituting liquid-connecting columns, which are shiftable in the pipes and cylinders, whereby movement of the plunger in each cylinder will be transmitted to and give movement in a reverse direction to the plunger in the cylinder connected by one of the pipes C C' therewith. The cylinders and plungers in each device are arranged parallel with each other, and between said plungers at the upper ends of the cylinders of each device is located a gear-pinion $A^5$ $B^5$, and the proximate faces of the associated plungers of each device are made in the form of racks, which engage the interposed pinion. Said pinions $A^5$ $B^5$ are mounted rigidly on horizontal shafts $A^6$ $B^6$, which are rotatively mounted in the casings inclosing said devices.

$A^7$ designates a lever, which is connected with the outer end of the shaft $A^6$ outside of the dial of the receiving device and serves as the means for actuating the transmitting device and also as a pointer to coöperate with the dial thereof and to determine by its position with respect to the dial the order to be transmitted.

$B^7$, Figs. 10 and 11, indicates a pointer connected with the rotative shaft of the receiving device and which is located outside of the dial of said receiving device and coöperates with said dial, so as to indicate an order transmitted by the transmitting device.

By inspection of Figs. 3, 9, and 16 it will be noted that when one of the plungers of either device is depressed its associated plunger of the same device is elevated, this being true by reason of the meshing of the racks on said plungers with the interposed pinion. In other words, the rotation of the gear-pinion acts to elevate one of the plungers and to depress the other, and by reason of the columns of fluid between associated plungers of the transmitting and receiving devices the depression of one of the plungers in one of the devices will elevate the associated plunger in the other device, so that movement of one of the pointers will give positive simultaneous movement in the same direction of the other pointer and to a like extent. The liquid-pipes C C' are normally entirely independent from each other, so that ordinarily the sole communication between the plungers on different sides of each device is through the interposed gear-pinion.

The operative parts of the transmitting device are contained within a circular casing $A^8$, which is supported at the upper end of a hollow stand $A^9$, of any suitable construction. The circular casing $A^8$ consists of integral rear and circumferential walls $a\ a'$. The rear wall supports the various parts of the mechanism, while the circumferential wall affords a protection therefor.

$a^2$ designates a transparent or semitransparent circular dial, which may be made of glass or celluloid and located at the front of the casing. The various orders shown in Fig. 1 may be printed on said dial or on a sheet of paper attached to the inner face of the dial. $a^3$ designates a removable thin metallic sheet which is located outside of said dial in contact therewith to protect and support the same. Said plate $a^3$ is removably attached to the circumferential wall of the casing $a'$ in any suitable manner, as my screws. Said plate is provided in line with the orders on the dial with openings, as $a^{10}$, Fig. 4, through which the orders may be read. The dial may be illuminated by means of a lamp $A^{11}$, connecting with the casing in the manner shown in Fig. 4. The shaft $A^6$ is journaled at one end in a socket in the rear wall $a$ of the casing and passes at its other end through and has bearing in a removable plate $a^4$, which is attached by screws or the like to studs $a^5$, projecting forwardly from the back wall of the casing. The lever $A^7$ is attached to said shaft outside of said plate $a^4$. In order to hold the plungers $A^3\ A^4$ in proper meshing engagement with the pinion $A^5$, guide-rollers $A^{10}$ are provided on each side of said plungers and engage the outer faces of the same. Said guide-rollers are mounted on forwardly-extending shafts $a^7$, projecting from the back wall of the casing, and are peripherally grooved to fit the adjacent faces of the plungers, which are in this instance made particylindric.

The cylinders $A'\ A^2$ are attached to the rear wall of the casing by means of metal frames $a^8\ a^8$, which are formed to clasp the cylinders and are attached to said rear wall by means of screws, which enter studs $a^9$, projecting forwardly from said rear wall, as shown in Fig. 3. The lower ends of said cylinders project through the circumferential wall of the casing into the upper end of the stand $A^9$ and are connected in the upper end of stand to the pipes C C'.

Next referring to the construction of the receiving device and to the parts which coöperate with the mechanical connections between the same and the transmitting device, said parts are made as follows: The operative parts of said receiving device are contained within a casing $B^8$, comprising a rear wall $b$ and a circumferential wall $b'$. Said casing may be supported on a stand like the casing of the transmitting device, but is herein shown as attached to a stationary object D, which may be the wall of the engine-room, where the device is located. The rotative shaft $B^6$, on which the gear-pinion $B^5$ is mounted, is journaled at one end in a socket in the rear wall of the casing and between its ends in a plate $b^2$, which is attached by screws to studs $b^3$, projecting forwardly from said rear wall. Said plate $b^2$ engages the outer end of the hub of the gear-pinion $B^5$ and holds the shaft of the same from lateral movement.

$b^a$ designates peripherally-grooved guide-rollers engaging the outer faces of the plungers and holding the same in proper engagement with the pinion $B^5$.

$b^4$ designates a circular plate, which is located in the front end of the casing and closes the same and is removably attached to an annular flange $b^5$, formed on the circumferential wall $b'$ of the casing. The said plate $b^4$ forms a backing for a dial-sheet $b^6$, which is fastened to the front face of the plate and visible from the front of the casing. The rotary shaft $B^6$ extends through the plate and dial and extends beyond said dial for attachment thereto of the pointer $B^7$.

$b^7$ designates a glass cover, which closes the extreme front end of the casing. Said cover is carried by an annular frame $b^8$, which fits outside of and is attached by screws or like means to the circumferential wall of the casing.

The cylinders $B'\ B^2$ are attached to the rear wall of the casing by means of metal frames $B^9\ B^9$, like the frames $a^8$ of the transmitting device. Said frames $B^9$ are attached by screws or the like to forwardly-projecting studs $b^9$ upon the rear wall of the casing. The lower ends of the cylinders $A'$ $A^2$ and $B'$ $B^2$ are provided with exhaust-openings, which are closed by screws $a^a$ $b^a$, as herein shown. The removal of said screws permits the air to be exhausted from the spaces between the plungers and the columns of liquid within the cylinders when the plungers are being placed within the cylinders, so as to avoid cushions of air between the plungers and liquid columns. The plungers used in both devices are made like the construction shown in Figs. 13, 14, and 15, which construction is as follows: The lower end of said plunger is reduced, as shown in Fig. 13, and on said reduced portion of the plunger are mounted a series of expansible parts, which are constructed to prevent the passage of liquid between the same and the cylinder. Said expansible parts consist of collars, which are slipped over the reduced portion of the plunger, and these collars support yielding cups $b^{11}$, which surround the same and which are made open at one end and closed at the other end thereof. The bottoms or closed ends of said cups are interposed between adjacent collars, and the circumferential walls thereof engage the inner face of the cylinder. Said cups are made of any suitable yielding material, such as leather, and the circumferential walls thereof are held in engagement with the inner surface of the cylinder by means of expansion-rings $b^{12}$, which are located within the open ends of the cups and surround reduced parts of the collars $b^{10}$. The expansion-ring is shown as removed from the cup in Fig. 15 of the drawings, and consists of a plain tempered ring, which is slit and which is placed in the cup under compression, so that the action of the same is to hold the cup extended. The lower end of the plunger is screw-threaded and provided with a nut $b^{13}$, which holds the series of collars and cups in place.

As before stated, each of the pipes C C' and its associated cylinders are normally out of communication with the other pipe and its cylinders. It sometimes occurs, however, by reason of leakage from one of the pipes or other reason that there is more liquid in one of the pipes and its associated cylinders than in the other pipe and cylinders, and in this event the movement of the levers or pointers $A^7$ of the transmitting device will not produce a corresponding movement of the pointer $B^7$ of the receiving device. It therefore becomes necessary to equalize the liquid columns in the pipes and their associated cylinders, and this is done by the following construction, which is shown in Figs. 3, 4, 5, and 6 of the drawings. E E' designate two laterally-separated casings located within the stand $A^9$ and extending horizontally from the front to the rear thereof. Said casings are provided on their upper and lower sides with nipples $e$ $e'$, the upper ones, $e$, of which are connected by coupling-sleeves $E^2$ with the lower ends of the cylinders and the lower nipples $e'$ of which are connected by other coupling-sleeves $E^3$ with the pipes C C'. Said casings are connected by a transverse pipe or passage $E^4$, affording communication between the same. Said passage is normally closed by a rotative valve-plug $E^5$, which is provided opposite to the passage with a through-port $e^2$, which when turned in line with said passage affords communication between the casings. Said valve-plug has bearing at one side of the passage in a socket therein and at the other side in a sleeve $e^3$, which is provided with a stuffing-box, surrounding the shank of the plug and affording a fluid-tight joint between the same. The shank of the plug extends outwardly through the wall of the stand and is provided at its outer end with an operating-lever $E^6$, by which the valve is opened and closed. The shank of said valve-plug passes through a removable plate or closure $A^{12}$ of said stand, which when removed affords access to the connections just described, and the lever $E^6$ is detachably connected with the shank, as shown in Fig. 4, whereby it may be removed preparatory to removing the closure $A^{12}$. The casings E E' and the connecting-passage interposed between said pipes and cylinders constitute a by-pass between said parts, whereby liquid may be transferred from one to the other when the valve $E^5$ is open. When it is found that one of the pipes C C' and its associated cylinders contain less liquid than the other pipe and cylinders, the valve $E^5$ is rotated to open the passage between said pipes and the lever $A^7$ is grasped and rotated to the limit of its movement either to the place indicated by the order "all right" or "stand by," or to both, and the liquid is free to shift from one pipe to the other until the two columns are equal. When the columns of liquid have been equalized, the valve in said by-pass will be closed and will cut off communication between the two pipes C C', so that their actions thereafter will be independent, as before. The movement of the pointers in either direction is limited by stops at the ends of the dials, and should the pointer $B^7$ be shifted ahead or behind the pointer $A^7$ such condition will be indicated to the person at the transmitting device when he attempts to move the pointer $A^7$ to the stop at each end of the dial by reason of the fact that the movement of said pointer will be arrested at one end of the dial before it reaches the stop thereon, because the pointer $B^7$, which is at this time ahead of the pointer $A^7$, is arrested and through the mechanism described arrests the said pointer $A^7$.

Means are provided for constantly replenishing the liquid within the cylinders and pipes in case of leakage of the same. In the present instance such supply of liquid is provided through the medium of a tank F, which is herein shown as attached to the rear wall of the casing outside of the same and provided with a discharge-pipe F', having at its lower end branches $ff$, which enter the casings E E', before described. Suitable check-valves are interposed between the discharge ends of said branches $f$ and the parts of said casing in communication with the pipe and so constructed as to permit the passage of the liquid into said casing and pipe, but prevent the backflow of the liquid from said casing to the branches. As herein shown, said valves have the form of flexible cups $f'f'$, which fit over the discharge end of the passages connected with said branches, and are provided at their opposite ends with slits, through which the liquid passes into either of the casings E E'. The said cups are made conical on their inner ends, which contain the slits, so that back pressure of the liquid acts to close the discharge-slits therein and prevents the water passing backwardly through the branches. As herein shown, the branches $f$ of the discharge-pipe communicate with passages $ff^2$, formed in a removable plug $F^2$, which has screw-threaded engagement with the casings and forms the ends thereof. Said plugs are provided on their inner ends surrounding the passages $f^2$ with flanges, with which the valve-cups $f'$ have interlocking engagement, as clearly shown in Fig. 6. Under ordinary conditions when the tank F is in communication with the pipes C C' in the manner set forth the supply of liquid from said tank will maintain the liquid columns equal, and the by-pass between the pipes will not ordinarily be resorted to, except where a considerable leakage from one pipe has occurred.

We will now describe the construction by which the various audible signals and alarms are given, first describing the parts of the transmitting device and receiving device and the engine-reversing mechanism embodied in such audible signaling mechanism and afterward describing the wiring between the same and the manner of operation.

The transmitting device is provided within the casing $A^8$ with a metal segment G, which is concentric with the shaft $A^6$, on which the actuating-lever $A^7$ is mounted. Said segment G constitutes the greater portion of a circle, it being interrupted at the lower side of the casing and corresponding in length to the length of the part of the dial on which the various orders are printed. The said segment is removably attached by means of screws or the like to forwardly-extending studs G', connected with the rear wall of the casing, and between said studs and rings are inserted insulating-sleeves, which insulate the ring from the parts of the casing.

H designates a switch-lever which is connected at one end with the shaft $A^6$ and turns therewith and extends at its outer end over the margin of said segment G. Said lever H is held normally out of contact with the segment G by means of a spring H', which is slipped over the shaft $A^6$ at its inner end, but may be moved into contact with said segment. Said lever H for this purpose is pivoted to the shaft $A^6$ to oscillate in a plane parallel with the axis of the shaft. This construction is shown more clearly in Figs. 7 and 8 of the drawings. As herein shown, the end of the shaft $A^6$ outside of the bearing-plate $a^4$ is enlarged and provided with an opening $a^{12}$, in which the inner end of the lever H is located, and the lever is pivoted in said opening on a pivot-pin $a^{13}$, which extends across the opening at right angles to the axis of the shaft. As a means for oscillating the switch-lever H to bring the outer end thereof in contact with the segment G, the actuating-lever $A^7$ is pivoted to the shaft $A^6$ to swing in a plane parallel with the axis of said shaft and is so connected with said lever H as to swing the same inwardly when the actuating-lever is swung inwardly. This construction is also shown in Figs. 7 and 8 and is made as follows:

The outer and enlarged end of the shaft $A^6$ is provided with a socket in which the inner end of the actuating-lever fits, and said lever is pivoted therein on a pivot-pin $a^{14}$, extending transversely across the same. Extending between the adjacent faces of the actuating-lever and switch-lever are two endwise-movable pins $a^{15} a^{15}$, which pass loosely through openings in the shaft and bear at their opposite ends against the actuating and switch levers. Said pins serve to transmit motion from the actuating-lever $A^7$ to the lever H, and being laterally separated and contacting with both levers on opposite sides of their pivots give stability to the actuating-lever. The plate $a^3$, closing the outer end of the transmitting-device casing, is provided at its margin with a curved flange or rim $a^{16}$, which corresponds in shape to the shape of the segment G and to the series of orders on the dial. Said rim $a^{16}$ is provided at points directly in line with the orders thereon with shallow V-shaped notches $a^{17}$, and the lever $A^7$ is provided with a projection $a^{18}$, adapted to enter said notches. When said projection on the said lever $A^7$ enters the notches $a^{16}$, said lever may be depressed inwardly far enough to oscillate the switch-lever H against the segment G. The rim $a^{16}$ is provided at ends thereof with stops $a^{19} a^{20}$, located, respectively, at the orders "all right" and "stand by," whereby the movement of the lever will be limited when it has been brought into contact therewith.

I designates an electric bell which is located in the transmitting device and through which an audible alarm may be received from the person located at the receiving device and which may indicate to the person at the transmitting device other signals and alarms.

Within the casing $B^8$ of the receiving device is located a ring J, which is supported therein on forwardly-extending lugs J', connected with the rear wall of the casing. Said ring J is concentric with the shaft $B^5$, on which the pointer $B^7$ is mounted. Said ring is made of any suitable insulating material, such as gutta-percha or the like, and is provided on its front face with a plurality of metallic buttons $J^2$, constituting contact-pieces. All of said buttons are adapted to be electrically connected by a wire, as will hereinafter more fully appear.

K designates a switch-lever which is connected at its inner end with a sleeve K', which latter is keyed to the shaft $B^6$, and said lever extends at its outer end over the ring J and is adapted to have contact severally with the contact-pieces $J^2$ thereon. Said lever is in the present instance provided on its inner surface with a projection $K^2$, constituting a contact-piece for the lever, and the projection is beveled on its front and rear sides with reference to its circular direction of motion, so as to permit the same to pass readily onto the contact-pieces $J^2$ of the ring.

L L' designate short circular segmental strips on each side of the ring J and secured to the inner surface of said ring with their outer edges projecting slightly forward of the front face of the ring. Said segmental strips L L' are of such length as to extend over that part of the ring on each side thereof occupied by the contact-points corresponding with the orders "full," "half," and "slow."

M designates a conducting-strip having the form of a spring which is attached to the rear face of the switch-lever K and is adapted to bear upon said segmental strips L L' when the outer end of the lever is over the strips and to be simultaneously in contact with said strip when the lever K is in contact with either one of the corresponding contact-pieces $J^2$. The ring J is provided adjacent to the contact-pieces corresponding with orders "all right" and "stand by" with stop-plates $j\ j$, which limit the movement of the lever K and stop $B^7$ in both directions.

N designates an electric bell which is located within the casing of the receiving device and through which an audible alarm may be received from the transmitting device.

O, Figs. 16, 17, and 18, designates the usual reversing-lever of an engine, and O' the quadrant associated therewith. Said quadrant is provided with three binding-posts $o\ o'\ o^2$, with each of which is connected a contact-point, all designated by $o^3\ o^4\ o^5$.

$O^2$ designates a switch-lever having the form of a cross with equal arms, which is pivoted at its center on the contact-pieces $o^4$. The arms of said lever are made of such length as to engage the adjacent contact-pieces $o^3\ o^5$ and are adapted to alternately have contact with the same. The said lever is so arranged on the quadrant that one arm thereof projects into the path of the reversing-lever O, so that the shifting of the reversing-lever acts to bring the contact-piece $o^4$ into electrical connection with either of the contact-pieces $o^3\ o^5$. When the lever is in the position for driving the engine "astern," (shown in Figs. 17 and 18,) the switch-lever $O^2$ will be in position to bring the contact-piece $o^4$ into communication with the piece $o^3$, and when the lever is reversed to drive the engine "ahead" the contact-piece $o^4$ will be brought into communication by the lever $O^2$ with the contact-piece $o^5$.

Referring now to the wiring which connects the several parts of the device above mentioned, the same is arranged as follows: P designates a source of electrical energy, which may be a primary battery. From said battery leads a wire 1 to a binding-post $g'$ on the segment G. From a binding-post $g^2$ on the other side of said segment leads a wire 2 to the binding-post $o'$ on the reversing-lever quadrant. From said binding-post $o'$ leads a wire 3 to a push-button Q, which is located adjacent to the receiving device. From said push-button Q leads a wire 4, which is connected with a wire 5, leading to one pole of the electric bell N of the receiving device, and said wire 4 is also connected with a wire 6, leading to one of the poles of the electric bell I of the transmitting device. From the other pole of the electric bell N leads a wire 7 to the pole of the bell I opposite to that with which the wire 6 is connected, and from the same pole of the bell I leads a wire 8 to the battery P. From the binding-post $o^2$ leads a wire 9 to a binding-post on the segmental strip L', and from the binding-post $o$ leads a wire 10 to a binding-post on the segmental strip L. The contact-pieces $J^2$ of the receiving device are connected by a wire 11, and one of said contact-pieces is connected with one of the poles of the electric bell N, with which the wire 5 is connected by means of a wire 12. For certain of the signals the switch-lever H, the segment G, the shaft $A^6$, the pipes C C', the shaft $B^6$, lever K, and strip M constitute parts of the circuit between the transmitting and receiving devices. With this arrangement a signal may be transmitted from a person controlling the transmitting device to the receiving device when the lever $A^7$ is in line with either of the several orders on the dial by pressing said lever inwardly, and thereby moving the switch-lever H into contact with the ring G. At this time the circuit will be closed through wire 1, segment G, lever H, shaft $A^6$, the pipes C C', the shaft $B^6$, the lever K, the contact-pieces $J^2$, the wire 11, wire 12, electric bell N, wire 7, electric bell I, and wire 8 back to the battery P. The closing of said circuit will cause the bell N to ring, thereby indicating to the engineer that a new order has been given. The wires 5 and 6 connect like poles of the bells, so that a part of the current will be directed therethrough to ring the bell I, which will indicate to the person at the transmitting device that the proper circuit has been closed and that the engineer has received the audible signal desired. Such signal will ordinarily be transmitted after an order has been transmitted by the mechanical connection between the devices.

It often occurs that it is necessary or desirable that the engineer should communicate to the person controlling the transmitting device that he has properly received an order, and the electrical connections between said parts are such that this may be done. Such reply-signal will be especially desirable when the person at the transmitting device has given the order to "stand by," and especially when said order is given at the time the vessel is out of motion, as at such time the engineer may not be at his post. The reply-signal of the engineer is given by means of the push-button Q, and when said button is pushed inwardly the circuit is closed through the wire 1, segment G, wire 2, wire 3, wire 4, wire 6, electric bell I, wire 8, and battery P, which will ring bell I. The wire 5 is connected with the wire 6 and leads to one pole of the electric bell N, and the other pole of said bell is connected by wire 7 with the like pole of the bell I, so that with this arrangement the bell N will also ring. Such ringing of the bell N by the reply-circuit is not essential, but is only an incident of the particular arrangement here shown.

In addition to enabling the person at the transmitting device to send an audible signal to the engine-room and the engineer to transmit a reply-signal the device is so constructed that when the actuating-lever $A^7$ on the transmitting device is shifted from the "ahead" side of the dial to either of the orders "slow," "half," or "full" on the "astern" side, or vice versa, thereby indicating that the direction of motion of the engine is to be changed, an automatic audible alarm will be transmitted through the electrical connections until the reversing-lever O has been shifted to reverse the engine. It is assumed that the reversing-lever in Fig. 17 is in the position it would occupy when the vessel is being driven "astern" and that the switching-lever $O^2$ on the quadrant $O'$ is in the position to which it will be moved by said lever when the same has been shifted to its "astern" position. The lever $A^7$ in Fig. 16 is shown as indicating the order "all right." If now it is desired to give the order "ahead" either "full," "half," or "slow" the lever $A^7$ is shifted to the order desired, (the lever K being at this time over the corresponding order on the receiving-dial,) and without pressing the said lever inwardly to make contact between the switching-lever H and ring G, as before stated, an automatic alarm will be transmitted through a circuit as follows: wire 1, segment G, wire 2, wire 10, segment-strip L, spring M, lever K, contact-piece $J^2$, wire 11, wire 12, electric bell N, wire 7, electric bell I, wire 8, and battery P. Both the bells of the transmitting and receiving devices are sounded by reason of the connections between the same until the reversing-lever has been thrown over on the other side of the quadrant. The shifting of the reversing-lever in this manner through the switching-lever $O^2$ breaks the circuit between the contact-points $o^4$ $o^3$ on the quadrant and the wires 2 and 10, so that the alarm will cease sounding, and the person at the transmitting device will therefore know that his order has been obeyed. If, on the other hand, it be assumed that the reversing-lever is on the side of the quadrant in position to drive the vessel "ahead" or in position the reverse of that shown in Fig. 17 and with the lever $O^2$ connecting the contact-points $o^4$ $o^5$ and with the actuating-lever $A^7$ and the pointer $B^7$ moved to one of the orders on the "astern" side, a like alarm will be given by the device, which will continue until the reversing-lever has been shifted to drive the engine "astern" or in position shown in Fig. 17. Said alarm will be transmitted through a circuit in this instance as follows: wire 1, segment G, wire 2, wire 9, segment-strip L', spring M, lever K, contact-piece $J^2$, wire 11, wire 12, bell N, wire 7, bell I, wire 8, and the battery, and such alarm, as in the case above described, will continue until the reversing-lever has been shifted to the proper position. Said alarm-circuit may embrace as a part thereof other parts of the engine, such as the starting and stopping mechanisms, whereby an automatic alarm will be given at each new order, notwithstanding the position from which the pointer starts. With this construction and arrangement of the signaling apparatus described it will be observed that if at any time the lever $A^7$ and pointer $B^7$ should get out of their proper relation with respect to each other, so that when the lever $A^7$ is moved in line with any one of the orders of the dial the pointer $B^7$ and the switch-lever K will be out of line with the corresponding order on the receiving-dial, and the person therefore at the transmitting device is not able by pressing the actuating-lever inwardly to actuate the signal-bells by reason of the fact that the lever K is not at this time in line with one of the contact-pieces $J^2$, he will understand that the device is out of order and requires attention to adjust the same. In practice the person at the transmitting device will always press the lever inwardly to actuate the signal-bells when he has moved the lever from one order to the other on either the "ahead" or "astern" side of the dial for the purpose of indicating to the engineer that an order has been transmitted and also for the purpose of satisfying himself that the pointers of the transmitting and receiving devices are in their proper relation with respect to each other. When said pointers get out of their proper relation, as above described and indicated to him by failure of the signals to respond, the person at the transmitting device may open the valve between the pipes C C' and swing the actuating-lever to one or both of the stops on the dial, so as to equalize the liquid in said pipes in the manner before stated, after which the valve will be closed. It will further be understood that at the time the vessel is starting out on a trip the device will always be examined to detect whether or not the pointers are in their proper relation with respect to each other. Desirably the valve connection between the pipes will be open before each trip and the columns of liquid equalized in the manner stated, so as to minimize the danger of inaccurate operation of the device. So far as the invention is concerned relating to the electric signaling device it will be understood that the mechanically-operated part of the device may be otherwise constructed. Moreover, the arrangement of the parts of the signaling-circuits may be varied without departing from the spirit of the invention.

It will be desirable in practice to locate one of the transmitting devices at the pilot-house and to also locate one of said transmitting devices at each end of the bridge. Furthermore, it may be desirable in some vessels to locate another transmitting device at the rear end of the boat for the guidance of the mate, to indicate to him what orders are being transmitted from the bridge to the engine-room, so that he may be prepared to do such work as is required by the nature of such orders.

In Fig. 19 is indicated diagrammatically the manner of connecting the several transmitting devices on the deck with that of the receiving device of the engine-room. In said figure R S T designate as a whole the three transmitting devices at the front of the vessel, one at the pilot-house, and the other two at the ends of the bridge, and U designates a fourth transmitting device, which is located at the rear of the vessel, while V designates the receiving device, located in the engine-room. $s$, $r$, $t$, $u$, and $v$ designate the lines of pipes which connect said transmitting devices with the receiving device, and said pipes are arranged in such manner that the dials will all be located on the rear of the devices, that the indicating-pointers will be moved in the same direction for the same order, as in the case of a single transmitting and a receiving device.

The indicating-pointer $A^7$ may be retained at any desired signal after the signal has been given and complied with, so that when the person at the transmitting device is about to give a new signal or order he will at once know what was the last signal given, and the operator at the receiving device will have the same information.

The operator at the transmitting device is not restricted as to time when he may send a signal. In other words, he need not wait until the engineer has executed the order or signaled back that he has received it, but he may signal a new order before the first one is executed.

Although we have shown an approved and in some respects a preferred form of our invention as applied to a vessel to transmit orders from the bridge or like place to the engine-room, we do not wish to be limited to the details shown, except as made the subject of specific claims, as it is obvious that the details of the apparatus may be varied in many ways without departing from the spirit of our invention and that for use in other connections than herein shown and described the apparatus may be differently organized.

We claim as our invention—

1. The combination with a transmitting and a receiving device, each embracing a dial having visual characters thereon, and an indicating-pointer coöperating with each dial, of connections between said devices by which a movement of one of said pointers on its dial moves the other pointer a like extent on its dial, embracing two shifting columns of liquid contained in normally-independent pipes extending between said devices, and a source of liquid-supply in communication with both of said liquid-pipes through connections embracing check-valves which open toward said pipes.

2. The combination with a transmitting and receiving device, each comprising two cylinders, a plunger in each cylinder and a rack connected with each plunger, of a gear-pinion between and meshing with adjacent racks, a pointer actuated by said gear-pinion, a dial on each device coöperating with the pointer thereof, two pipes extending between and connecting the cylinders of the devices and normally independent of each other, a casing contained in each pipe, a suitable source of liquid-supply, a discharge-pipe connected therewith having two branches, one of which is connected with each casing, and an inwardly-opening check-valve located between the discharge end of each branch and the liquid-pipes.

3. A transmitting device comprising a casing, a dial therein, a pointer coöperating with said dial and constructed to constitute an actuating-lever for the device, a metallic strip in said casing parallel with the plane in which the pointer moves and of a length approximately equal to the length of the traverse of the pointer, a switch-lever which oscillates toward and from the strip, which is normally out of contact therewith and is adapted for physical contact with said strip, and connections between the lever and pointer for moving the former into physical contact with the strip.

4. A transmitting device comprising a casing, a dial therein, having thereon a series of orders, a pointer coöperating with said dial and constructed in itself to constitute an actuating-lever for the device, a metallic strip in said casing parallel with the plane in which said pointer moves, a switch-lever which oscillates toward and from the strip, and is normally out of contact therewith, connections between the lever and the pointer for moving the former into contact with the strip, and notches in said casing, one in line with each order on the dial and designed to receive the pointer when it is moved to bring the switch-lever into contact with said strip.

5. A transmitting device comprising a circular casing, a shaft journaled concentrically therein, a gear-pinion rigid on said shaft, two cylinders, plungers therein, parallel racks on said plungers on opposite sides of said gear-pinions and meshing therewith, a pointer on the shaft constructed to constitute an actuating-lever for the device, a dial with which said pointer coöperates, a metallic segment in said casing which is insulated from the casing and concentric with said shaft, an oscillatory lever carried by said shaft, which is normally out of contact with said segment and adapted for physical contact therewith, said lever being electrically connected with the shaft, and the pointer being pivoted to the shaft to swing in a plane parallel with the axis of the shaft and constructed to oscillate the lever to move it into physical contact with the segment.

6. A transmitting device comprising a circular casing, a shaft journaled concentrically therein, a gear-pinion rigid on said shaft, cylinders in said casing, plungers in the cylinders, parallel racks on said plungers on opposite sides of the gear-pinion and meshing therewith, a dial, an actuating-lever outside of said dial which oscillates in a plane at right angles to the axis of the shaft and is connected therewith, a metal segment within said casing concentric with the shaft, a switch-lever pivoted to said shaft and oscillating in a plane parallel with the actuating-lever and laterally-separated pins mounted loosely in openings in said shaft and bearing at their opposite ends against the adjacent sides of the switch and actuating levers.

7. A receiving device comprising a casing, a dial therein, a pointer coöperating with said dial, a series of separated contact-pieces in said casing electrically connected with each other and arranged in a plane parallel with the plane of movement of the pointer, a switch-lever movable with the pointer and designed to have contact severally with the said contact-pieces, metal strips in said casing adjacent to said series of contact-pieces and insulated therefrom, and a spring on said switch-lever adapted to have contact with one of said strips simultaneously with the contact of the switch-lever with one of the adjacent contact-pieces.

8. A receiving device comprising a casing, a shaft therein, a dial in the casing, a pointer on the shaft coöperating with said dial, a series of separated contact-pieces in said casing electrically connected with each other and arranged in a plane parallel with the plane of movement of the pointer, a switch-lever electrically connected with said shaft and movable with the pointer, and designed for contact severally with said contact-pieces, metal strips in said casing adjacent to the said series of contact-pieces and insulated therefrom, and a spring on said switch-lever adapted to have contact with one of said strips simultaneously with the contact of the switch-lever with one of the contact-pieces.

9. A receiving device comprising a circular casing, a rotative shaft mounted concentrically therein, a dial in said casing, a pointer on the shaft coöperating with said dial, a ring in said casing concentric with said shaft, and made of insulating material, separated contact-pieces on said ring electrically connected with each other, a switch-lever rotating with said shaft adapted to contact severally with said contact-pieces metal segments connected with said ring and insulated from said contact-pieces, and a spring or strip on said switch-lever adapted to have contact with one of said segments simultaneously with the contact of said switch-lever with one or more of the contact-pieces on the ring.

10. The combination with the movable pointers of transmitting and receiving devices, and connections for giving synchronous and equal movement thereto, of an electric signaling-circuit having included therein parts of said devices, and adapted to be closed by movement of the actuating member of the transmitting device, said circuit being incapable of being closed when the pointers are out of their normal relation with respect to each other.

11. The combination with a transmitting and receiving device, each embracing a dial having characters thereon indicating the various orders to be transmitted and received, an indicating-pointer coöperating with the dial and means for giving synchronous movement to said pointers of the two devices, of an electrical signaling-circuit extending between said transmitting and receiving devices embracing a movable switch-lever in each device, a contact-strip in one device with which the associated lever is designed for contact, a plurality of separated and electrically connected contact-pieces in the other device with which the associated lever is designed to severally have contact, said last-mentioned lever being made of less width than the distance between said contact-pieces.

12. The combination with a transmitting and receiving device, each embracing a dial having visual characters thereon indicating the various orders to be transmitted or received, an indicating-pointer coöperating with each dial, and means for giving synchronous and equal movement to said pointers of the two devices, of an electric signaling-circuit which is closed by oscillation of the transmitting-pointer.

13. The combination with a transmitting and receiving device, each embracing a dial having visual characters thereon to indicate various orders to be transmitted or received, an indicating-pointer coöperating with each dial, and connections between said pointers by which movement of one of the pointers on its dial moves the other pointer a like distance on its dial, embracing two shifting columns of liquid contained in metal pipes extending between said devices, of an electric signaling-circuit between said transmitting and receiving devices which embrace as a part thereof said liquid-pipes.

14. The combination with a transmitting and receiving device, each embracing a dial having visual characters thereon indicating the various orders to be transmitted or received, an indicating-pointer which coöperates with each dial, and means for giving synchronous and equal movement to said pointers, of means for producing an automatic audible alarm when an order is transmitted from the transmitting device to the receiving device, said alarm being interrupted when the normal relation of the pointers with respect to each other is disturbed.

15. The combination with a transmitting and receiving device, each embracing a dial having visual characters thereon, indicating the various orders to be transmitted or received, an indicating-pointer which coöperates with said dial, and means for giving synchronous and equal movement to said pointers, of means for producing an automatic audible alarm both at the receiving device and transmitting device when a new order is transmitted from the transmitting device to the receiving device, said alarm being interrupted when the normal relation of the pointers with respect to each other is disturbed.

16. The combination with a transmitting and receiving device, each embracing a dial having visual characters thereon, an indicating-pointer which coöperates with said dial, and means for giving synchronous and equal movements to said pointers, of means for producing an automatic audible alarm, both at the receiving device and transmitting device when a new order is transmitted, said means including an electric switch which closes a circuit extending between said devices, and the means being constructed to continue an alarm until the order is executed or withdrawn.

17. The combination with a transmitting and receiving device, each embracing a dial having visual characters thereon, an indicating-pointer which coöperates with said dial, and means for giving synchronous and equal movements to said pointers, of an electric circuit extending between said devices for producing an automatic alarm both at the receiving device and the transmitting device, when a new order is transmitted, said circuit embracing a switch-lever located in each of the transmitting and receiving devices and movable with the pointer of said device.

18. The combination with a transmitting and a receiving device, each embracing a dial and a pointer which coöperates therewith, the pointer on the transmitting device constituting an actuating-lever, and connections between said levers whereby movement of one gives synchronous and equal movement to the other, of an electric signaling-circuit extending between the receiving and transmitting devices, said transmitting device being provided with a contact-plate approximating the length of the traverse of the pointer and an oscillatory switch-lever which are included within said electric signaling-circuit, said lever being normally out of contact with said plate, and adapted to be moved into physical contact therewith, and connections between said actuating lever or pointer of the transmitting device and said switch-lever whereby the switch-lever is actuated to be moved into physical contact with said contact-plate.

19. The combination with transmitting and receiving devices each embracing a circular dial and a pointer coöperating therewith, the pointer of the transmitting device constituting an actuating-lever, and connections between said pointers whereby movement of one produces synchronous and equal movement of the other, of an electrical signaling-circuit extending between said transmitting and receiving devices embracing as a part thereof a metallic segment in said receiving device of a length approximating that of the traverse of the pointer, a switch-lever therein which oscillates toward and from the segment, which is normally out of contact with said segment, but adapted for physical contact therewith, and connections between the actuating-lever and said switch-lever for moving the latter into physical contact with said segment.

20. The combination with a transmitting and receiving device, movable indicating-pointers on said devices, connections between said pointers for giving synchronous and equal movement to one by movement of the other, a reversing-lever and its quadrant adjacent to the receiving device, three contact-pieces on the quadrant, a switching-lever pivoted to one of the contact-pieces adapted to be actuated by the reversing-lever to alternately engage the other contact-pieces, which latter are included in an automatic alarm-circuit extending between the receiving and transmitting devices.

21. The combination with a transmitting and receiving device, each embracing a dial having visual characters thereon, indicating the various orders to be transmitted or received, an indicating-pointer which coöperates with said dial, and means for giving synchronous and equal movement to said pointers, of an electric circuit for producing an automatic audible alarm at the receiving device when a new order is transmitted from the transmitting device to the receiving device and arranged to continue the alarm until the order has been executed or withdrawn, said circuit embracing three contact-pieces insulated from each other, and a lever actuated by a part connected with the engine and designed to bring one of said contact-pieces alternately into electrical connection with the other contact-pieces.

22. The combination with means for transmitting a signal which is visually indicated at its point of reception, of an electrical circuit for producing an automatic audible alarm at the point of reception of the signal, when an order on the astern side is transmitted at the time the vessel is moving ahead and designed to continue said alarm until the order is complied with or withdrawn and vice versa, said circuit including a single switch-lever which is positively actuated to open the alarm-circuit in both directions of movement of the reversing-lever or like parts of the engine.

23. The combination with a transmitting device and a receiving device the latter of which is located in the engine-room, means for transmitting orders from the transmitting device which are visually indicated on the receiving device, and a lever connected with the engine, of an electric alarm-circuit including parts of said transmitting device and receiving device, and including also as a part thereof a single switch-lever which is positively actuated by said engine-lever in both directions of its movement.

24. The combination with the pipe C C', the casings E E' in communication therewith, plugs closing the outer ends of said casings, a passage extending between and connecting said casings, a valve in said passage, a liquid-reservoir, a discharge-pipe connected at one end therewith and provided at its other end with branches which are connected with passages in said plugs, and check-valves on the inner ends of said plugs over the passages therein.

25. The combination with a pipe C C', the casings E E' in communication therewith, plugs closing the outer ends of said casings, a passage extending between and connecting said casings, a valve in said passage, a liquid-reservoir, a discharge-pipe connected at one end therewith and provided at its other end with branches which are connected with passages in said plugs, and check-valves on the inner ends of said plugs fitting over the passages therein, said check-valves consisting of rubber cups which are open at their ends adjacent to the passages and provided at their other ends with slits, said slitted ends of said cups being conical on their exterior surfaces.

26. The combination with a transmitting and receiving device, each embracing a dial and an indicating-pointer coöperative therewith, of connections between said devices embracing two shifting columns of liquid contained in normally-independent pipes extending between said devices, a shell containing two chambers, each of which is connected with one of the pipes and located side by side, said shell being provided with a self-contained passage extending between the chambers therein, a valve for closing said passage having a handle which is accessible from the transmitting device, a liquid-supply pipe connected at one end with a supply-reservoir and provided at its other end with branches connected with the shell, and inwardly-opening check-valves between said pipes and said chambers.

27. A transmitting device comprising a circular casing, a shaft journaled concentrically therein, a gear-pinion rigid on said shaft, parallel racks on the opposite sides of said pinion and meshing therewith, a metal segment within the casing concentric with the shaft, said shaft being provided at its outer end with an integral enlargement having therein a socket, a switch-lever pivoted at one end in said socket, a pointer pivoted to the outer end of said shaft outside of said switch-lever and laterally-separated pins mounted loosely in openings in the said enlarged part of the shaft, and bearing at their opposite ends against the adjacent sides of the switch and actuating levers on opposite sides of their pivots.

28. The combination with a transmitting and receiving device, said transmitting device embracing a casing, and a hollow stand to the upper end of which said casing is attached, a pair of cylinders in said casing which project at their lower ends into the upper end of the stand and are connected at the upper end of the stand to liquid-containing pipes which extend to the receiving device, casings in said liquid-pipes located side by side which are connected by a transverse passage, a valve in said passage which normally closes the same, and a handle connected with said valve which extends outside of said stand, said stand being provided opposite to said casings with a removable closure, the removal of which permits access to the casings.

29. The combination with a transmitting and receiving device, the former embracing a casing, a dial thereon, a pointer which is constructed to constitute an actuating-lever, said device embracing parts therein which are included in an electric signaling-circuit, and which circuit is closed by pressing the lever inwardly, a rim on the casing, and notches on the rim corresponding in position to the orders on the dial said lever or pointer being adapted to be pressed into said notches to close said circuit.

In testimony that we claim the foregoing as our invention we affix our signatures, in presence of two witnesses, this 20th day of February, A. D. 1900.

ROBERT H. GRUSCHOW.
HOWARD H. OSBORN.

Witnesses:
TAYLOR E. BROWN,
WILLIAM L. HALL.